Patented Sept. 24, 1940

2,215,487

UNITED STATES PATENT OFFICE 2,215,487

TREATMENT OF WELLS

Jack Sutherlin, Great Bend, Kans., and Fred I. McConnell, Midland, Tex., assignors to The Dow Chemical Company, Midland, Mich., a corporation of Michigan No Drawing. Application March 9, 1938, Serial No. 194,768

3 Claims. (Cl. 166—21)

This invention relates to an improved method of acid treating wells to increase their output of oil or gas. It more particularly concerns an improved method of treating wells producing from calcareous formations.

It is a matter of record that conventional methods for acid treating wells in which a charge of acid is introduced into the surrounding formation to dissolve the calcareous matter therein, and thereby increase the ease with which fluids may flow into the well, do not always result in bringing about an adequate increase in production. It is characteristic of acid treatments in general that the acid first introduced into the well cannot be forced into the formation readily because the flow channels or pores of the formation are usually small and offer a high resistance to the flow of fluids through them. However, as the acid reacts with the rock, the flow channels are enlarged and the permeability of the formation adjacent the well bore is greatly increased so that the acid can be readily forced into the formation at an increased rate. The term "permeability" used herein and in the appended claims means that property of the formation which determines the rate at which fluids are able to flow into the formation at a given pressure in excess of the rock pressure. During some acid treatments, however, before any appreciable volume of acid can be injected into the formation at this increased rate, a rapid decrease in the permeability of the formation is observed, so that either a greatly increased pressure must be applied to the acid, or if the same pressure be maintained, the inflow eventually ceases. In conventional acid treating it is usually the practice to disregard irregularities such as decreases in the permeability of the formation during the injection of the remainder of the charge of acid and to attempt to force a preselected volume of acid into the formation regardless of the conditions encountered. To complete an acid treatment according to this practice often requires the use of excessive pumping pressures and the expenditure of a great deal of time before the pressure declines and the balance of the acid will enter the formation. For example, pressures upward of 1500 lbs. per square inch are often maintained for from 1 to 2 days or more in attempts to complete the injection of a charge of acid. We have discovered by correlating these observations with their effect on the increase in the rate of production of the well following such treatments, that when, in introducing the acid solution the above conditions are encountered and the point at which the acid readily enters the formation or the point of maximum permeability is passed through and the treatment is continued until the conventional volume of acid has been introduced into the formation according to the usual practice, the effect of the treatment on the output of the well is generally unsatisfactory.

The reason for this effect is not fully understood, but it is believed to be due to gelatinous precipitates of iron and aluminum hydroxides or other residues depositing and filtering out in the pores of the formation as the acid becomes spent. These residues, such as iron and aluminum hydroxides, formed as the acid reacts with the calcareous rock, remain in solution in the acid until it is nearly spent or neutralized, but deposit out rapidly when neutralization occurs after the acid has been in contact with the rock for a short period of time. Since the acid entering the formation first is in contact with the rock for a longer period of time, it is the first to become neutralized or spent; and as more acid is forced into the formation, the spent acid carrying the suspended residues is forced farther into the formation and into the small pores or flow channels where the suspended matter filters out forming an effective plug. Under these conditions continued introduction of the acid according to the conventional method requires the application of a very high pressure on the acid solution and the resulting increase in production from the well is generally unsatisfactory, since the flow of fluids back into the well when the pressure is released is hindered by plugging material deposited in the small flow channels or pores of the formation. However, what actually happens in the formation can never be fully ascertained, and we do not wish to limit the invention by any theory set up in explanation of the observed facts.

We have now discovered that much of the difficulty of injecting acid into the formation, when the condition of a decline in the permeability of the formation is observed during the injection of the initial portion of the charge of acid, can be overcome, and a much greater increase in production can be obtained, often with a lower expenditure of acid, by injecting the acid solution into the formation until the permeability of the formation to the acid reaches a maximum, then withdrawing the solution as the rate of introduction begins to decline, and repeating the injection of acid and withdrawal of the resulting solution similarly until the desired area of the formation has been acidized and the formation readily admits the acid. The rate of injection selected may be any convenient amount, depending upon the permeability of the formation at the time of treatment and the type of equipment being used. From 1 to 10 gallons per minute or more is generally suitable for most acid treatments. During the injection the pressure being applied on the acid and the rate of introduction of the acid into the formation is closely observed, and when the rate of introduction begins to decline, at the pressure being applied, the injection of acid is stopped and the resulting solution is withdrawn from the formation to avoid the possibility of completely plugging the pores by forcing the suspended matter into the pores of the formation.

The invention then consists of the method hereinafter fully described and particularly pointed out in the claims.

In carrying out a treatment according to the invention the following steps are performed: 1. Acid solution is injected into the well under a pressure sufficient to force it into the formation, the introduction being continued until the permeability of the formation to the acid solution passes through a maximum. The point of maximum permeability varies according to the formation, and may be reached in most cases with from 100 to 400 gallons of acid solution when 15% hydrochloric is used. As the permeability of the formation to the acid begins to decline, the pressure on the well is released. The well is then swabbed, pumped, bailed, or allowed to flow to remove the spent solution from the formation. Ordinarily from one to three hours are required to remove this solution, although the time consumed in carrying out this step is dependent upon the porosity of the formation and the amount of acid injected. 2. After removing the spent solution, a fresh charge of acid is injected into the well under sufficient pressure to enter the formation until its permeability to acid again passes through a maximum, the volume of acid required to react this second point of maximum permeability being in some cases from 500 to 1000 gallons or more. The pressure is again released and the spent solution is removed as previously described.

To produce the best results it is generally necessary to repeat the injections of acid and withdrawal of spent solution according to the described method until a substantial area of the formation being treated has been acted upon by the acid, and the solution enters the formation relatively easily. Since the volume of acid required for each successive charge is usually from two to three times the volume used in the preceding charge, and since the volume of acid used in the first charge is usually from 125 to 400 gallons, ordinarily from two to three charges of acid are sufficient to produce the desired effect, and to treat a considerable area of the formation. The acid used in each injection is preferably withdrawn immediately upon completing the injection of the charge of acid, but may be allowed to remain in the formation for a time to insure more complete reaction.

The total volume of acid solution used for a treatment may vary over wide limits, such as from 500 to 6000 gallons or more, depending on the conditions encountered.

Although we prefer to employ a mineral acid such as hydrochloric, nitric, or mixtures thereof, any acid capable of forming water soluble salts with the constituents of the formation may be used. Hydrochloric acid is generally suitable. In order to protect the metal parts of the well from the corrosive action of hydrochloric acid, we may employ a relatively small amount of an inhibitor as described in U. S. Patent 1,877,504. The strength of aqueous hydrochloric acid most suitable for calcareous formations is between about 10 and 15 per cent, although other concentrations may be used, if desired. The concentration of acid used in each charge may also be varied as desired.

In the practical use of our method in wells producing oil from siliceous limestone formations, we have obtained increased yields of several times those obtained by use of the conventional method in wells drilled into the same formation and producing similar amounts of oil. For example, a well was treated with an acid employing the conventional method in which a charge of 3000 gallons of 15 per cent hydrochloric acid was injected into the formation. Before treatment this well produced 50 bbls. of oil per day, and as a result of the treatment production was increased to 215 bbls. of oil per day. In an attempt to further increase the rate of production, another conventional treatment was given two weeks later in which 4000 gallons of 15 per cent hydrochloric acid was pumped into the well and forced into the formation. The oil production was thereby increased from 215 bbls. to 261 bbls. of oil per day. In both of the above conventional treatments a pressure of 1000 lbs. per sq. in. was applied to the acid in forcing it into the formation, and soon after the acid began to enter the formation the rate at which the acid could be forced into the formation at this pressure greatly decreased. In comparison an offset well producing from the same formation at a rate of 50 bbls. of oil per day was treated according to our improved method as follows: A charge of 10 per cent hydrochloric acid was started into the formation by pumping the acid into the well under pressure. At a pressure of 1200 lbs. per sq. in., 295 gallons of acid was introduced into the formation before the rate of introduction of the acid at this pressure indicated that the maximum permeability of the formation had been reached. The pressure was then released and the well swabbed immediately for one hour to remove the spent solution. A second charge of acid was started into the formation under substantially the same pressure as previously employed. In this injection about 900 gallons of acid entered the formation before the rate of introduction again indicated that the permeability of the formation had passed through a maximum. The pressure was then released and the well swabbed for two hours to withdraw the spent solution. A third charge of acid was then introduced into the formation. This time the rate of introduction of the acid rapidly increased while the pressure required to force the solution into the formation rapidly decreased, and when 800 gallons of acid had been introduced into the formation the pumps were working at maximum capacity at a pressure of only 100 lbs. per sq. in. This clearly indicated that the formation was sufficiently permeable and, as a substantial area of the formation had been acidized, further introduction of acid was therefore unnecessary. After withdrawing the spent solution this well produced at a rate of 987 bbls. of oil per day. Thus by the use of our improved method, in which a total of only 2000 gallons of acid was employed, the output of the well was increased from 50 to 987 barrels per day, while the production of a similar well treated according to the conventional method was only increased from 50 to 261 barrels per day by the use of 7000 gallons of acid.

The method, therefore, not only was very much more effective to increase production, but also produced an increased out-put with very much less acid. The method has been used repeatedly in the treatment of wells in calcareous rock and siliceous limestone formations where it has given similar improved results over those hitherto obtained by the conventional acid treating method.

Although it is the usual practice in carrying out an acid treatment according to the invention to inject the acid reagent into the formation under conditions of varying rate and pressure until the permeability of the formation to the reagent passes through a maximum, it will be understood that it is within the scope of the invention to inject the acid at a constant pressure until at this pressure the rate of flow of the acid reagent into the formation passes through a maximum, or to inject the acid at a constant rate of flow until the pressure required to force the acid into the formation passes through a minimum.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of acid treating a well in a calcareous formation wherein the permeability of the formation reaches a maximum and then declines during the introduction of the acid according to the conventional method, the steps which consist in introducing an acid reagent into the well under pressure until the permeability of the formation reaches a maximum and commences to decline, then releasing the pressure and withdrawing the spent acid and repeating the foregoing steps.

2. In a method of acid treating a well in a calcareous formation wherein upon introducing the acid at a constant rate of flow the pressure required to maintain this constant rate passes through a minimum and then increases during the introduction of acid according to the conventional method, the steps which consist in introducing the acid reagent into the well under pressure at a constant rate of flow until the pressure applied to the acid passes through a minimum and commences to increase, then releasing the pressure and withdrawing the spent acid, and repeating the foregoing steps.

3. In a method of acid treating a well in a calcareous formation wherein the permeability of the formation reaches a maximum and commences to decline during the introduction of the acid by the conventional method, the steps which consist in introducing the acid into the formation, measuring the rate of flow of acid into the formation as well as the pressure required to force the acid into the formation, continuing the introduction of acid until the permeability of the formation, as determined by the rate of flow of the acid and the pressure being employed to force the acid into the formation, passes through a maximum, releasing the pressure, withdrawing the spent acid and repeating the foregoing steps.

JACK SUTHERLIN.
FRED I. McCONNELL.